(12) United States Patent
Yamada

(10) Patent No.: US 6,674,515 B2
(45) Date of Patent: Jan. 6, 2004

(54) LIGHT BEAM CUT-OFF DEVICE

(75) Inventor: Naoto Yamada, Kanagawa (JP)

(73) Assignee: Fuji Photo Film Co, Ltd., Kanagawa (JP)

(*) Notice: Subject to any disclaimer, the term of this patent is extended or adjusted under 35 U.S.C. 154(b) by 38 days.

(21) Appl. No.: 10/104,021

(22) Filed: Mar. 25, 2002

(65) Prior Publication Data

US 2002/0140914 A1 Oct. 3, 2002

(30) Foreign Application Priority Data

Mar. 27, 2001 (JP) ........................................ 2001-090938

(51) Int. Cl.[7] ........................... G03B 27/72; H04N 1/024
(52) U.S. Cl. ........................................ 355/71; 347/233
(58) Field of Search .................. 355/67, 71; 347/225, 347/231, 233, 241, 243, 250; 358/1.1

(56) References Cited

U.S. PATENT DOCUMENTS 3,833,295 A * 9/1974 Bebb et al. .................. 355/32
4,922,392 A * 5/1990 Egami et al. ................ 362/217
5,459,557 A * 10/1995 Hasegawa et al. .......... 399/128
5,974,229 A * 10/1999 Yoshino ...................... 358/1.9
6,552,778 B1 * 4/2003 Konagaya .................... 355/71

FOREIGN PATENT DOCUMENTS

JP 9-121369 5/1997

* cited by examiner

Primary Examiner—Alan A. Mathews
(74) Attorney, Agent, or Firm—Sughrue Mion, PLLC

(57) ABSTRACT

A light beam cut-off device installed separately from a light beam scanning device and making it possible to cut off a light beam emitted from the light beam scanning device to a photosensitive material when exposure for the photosensitive material is stopped, and prevent transmission of vibration to the light beam scanning device. The light beam cut-off device disposed below the light beam scanning device. An elongated plate shutter member extending along a main scanning direction of a laser beam emitted from the light beam scanning device, is provided so as to, when exposure for the photosensitive material is stopped, swing due to driving force of the stepping motor to a position at which the laser beam is blocked. Further, when the photosensitive material is exposed, the shutter member swings to a position at which it retreats from the optical path of the laser beam.

8 Claims, 8 Drawing Sheets

SUB-SCANNING DIRECTION

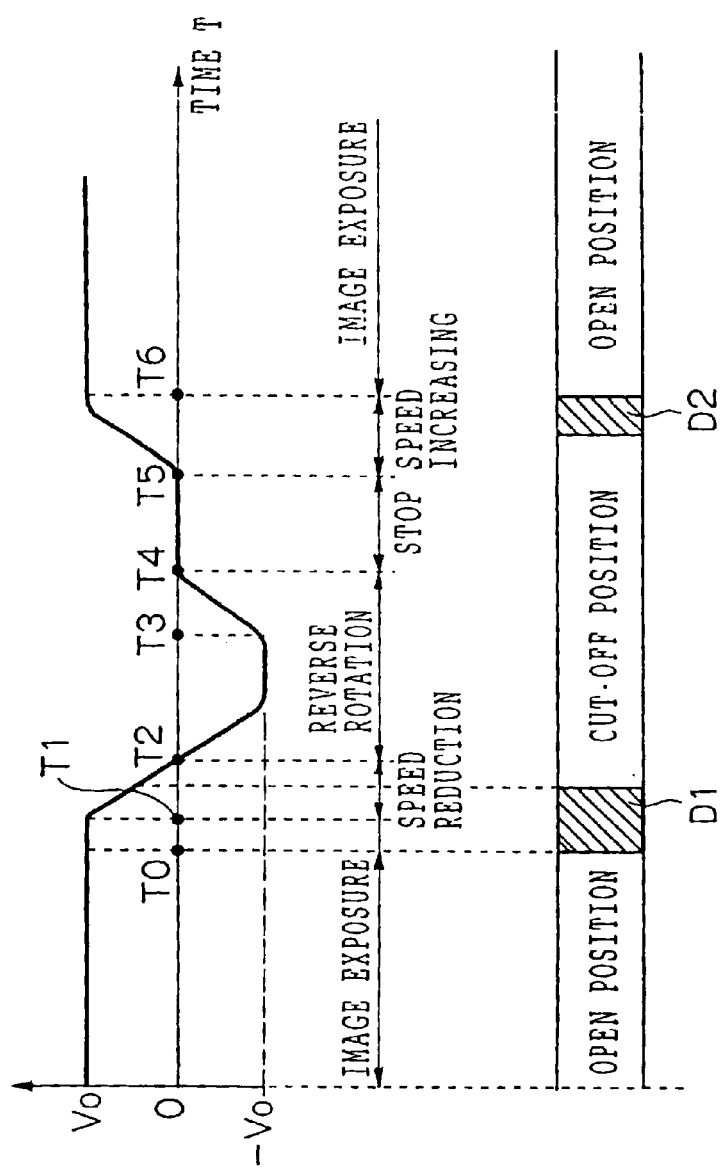

LIGHT BEAM CUT-OFF DEVICE

BACKGROUND OF THE INVENTION

1. Field of the Invention

The present invention relates to a light beam cut-off device which is applied to, for example, an image recording apparatus in which a light beam modulated by a light beam scanning device in accordance with image information is generated and a photosensitive material is exposed to the light beam to allow an image to be formed thereon, which light beam cut-off device cuts off the light beam at a position between the light beam scanning device and the photosensitive material at the time exposure for the photosensitive material is stopped.

2. Description of the Related Art

In recent years, a digital photographic printer (hereinafter referred to as "photographic printer") utilizing digital exposure has been put to practical use. In the photographic printer, a light beam modulated in accordance with digital image data is deflected by a light beam scanning device in a main scanning direction, and at the same time, a photosensitive material being conveyed in a sub-scanning direction is exposed by scanning to the light beam to allow an image (latent image) to be formed thereon. Thereafter, the photosensitive material is conveyed to a developing section and subjected therein to developing processing, and outputted as a print (photograph). In some of such photographic printers, roll paper in which an elongated photosensitive material is wound in the form of a roll is used to carry out printing processing and developing processing for the photosensitive material continuously for a long time. In the photographic printer in which roll paper is used as the photosensitive material, roll paper pulled out from a magazine is subjected to various processing including exposure, developing and drying while being conveyed along a predetermined conveying path, and cut out for each frame by a cutter provided in the vicinity of an exit of the developing section and made into photographic prints. The light beam scanning device used by such a photographic printer may be provided with a light source such as a laser diode (LD) for outputting a light beam, a main scanning means which deflects a light beam outputted from the light source and effects main scanning by the light beam on a photosensitive material, and an external modulator for modulating the light beam outputted from the light source based on an image signal.

In the aforementioned photographic printer, so long as a plurality of image signals each bearing an image are sequentially supplied without placing a waiting time therebetween, images can be sequentially recorded without stopping conveying of a photosensitive material. However, there is a possibility that an image signal which bears an image to be subsequently recorded is not immediately supplied at the time recording of a certain image is completed. In this case, generally, conveying of the photosensitive material is temporarily stopped so that the photosensitive material may not be wastefully consumed. However, in a case in which a light beam is modulated by an external modulator, if the photosensitive material is brought into a stopped state, a region of the photosensitive material with an image recorded thereon, or its vicinities may be affected by fogging. In other words, when the external modulator is used, a recording light source is generally brought into a state of being continuously turned on, and the extinction ratio of a light modulator such as an acousto-optic modulator (AOM) is about 1:1000. The light beam emitted from the recording light source in a state of being continuously turned on cannot be completely cut off, and therefore, the photosensitive material stopped at a fixed position is irradiated with the light beam. Although the light beam is very weak, a fixed region on the photosensitive material is continuously irradiated with the light beam during the photosensitive material being stopped, thereby causing fogging on the photosensitive material. Such fogging of the photosensitive material occurs not only in a blank region but also in an image region in accordance with a method for controlling conveying of the photosensitive material. As a result, the quality of a printed photographic image is considerably deteriorated.

Some of conventional light beam scanning devices applied to an image recording apparatus such as a photographic printer may include therein a mechanical shutter mechanism for a light beam so as to prevent the aforementioned fogging of a photosensitive material. Such a light beam scanning device is disclosed in, for example, Japanese Patent Application (JP-A) No. 9-121269. However, the mechanical shutter mechanism unavoidably generates a vibration and the vibration is transmitted to a light source or a main scanning means, which results in deterioration of image quality. Accordingly, the light beam scanning device needs to have a vibration cut-off structure which prevents transmission of a vibration from the shutter mechanism. However, the vibration cut-off structure is disposed in a narrow inner space of the apparatus and the structure becomes complicated.

Further, in a photographic printer in which an image is formed on a photosensitive material (sheet paper) previously in the shape of a sheet, sheet paper can be held at the upstream side of an exposure position at the time exposure by the light beam scanning device is stopped. Therefore, no shutter mechanism for preventing occurrence of fogging needs to be provided in the light beam scanning device. However, the light beam scanning device having no built-in shutter mechanism is not directly applied to a photographic printer in which an image is formed on an elongated photosensitive material (roll paper), and needs to be modified on a large scale. For this reason, the light beam scanning device cannot be shared between the photographic printer for forming an image on sheet material and the photographic printer for forming an image on roll paper. As a result, reduction in costs of the device cannot be facilitated.

SUMMARY OF THE INVENTION

In view of the aforementioned circumstances, it is an object of the present invention to provide a light beam cut-off (blocking) device which can be installed separately from a light beam scanning device and which can cut off a light beam emitted from the light beam scanning device immediately before a photosensitive material at the time exposure for the photosensitive material is stopped, and can prevent transmission of a vibration to the light beam scanning device.

In accordance with a first aspect of the present invention, there is provided a light beam cut-off device which comprises: a shutter member disposed between a light beam scanning device which emits a light beam, and a photosensitive material exposed to a light beam emitted from the light beam scanning device, and supported in a movable manner between a cut-off position at which an optical path of the light beam emitted from the light beam scanning device is cut off by the shutter member, and an open position at which the shutter member retreats from the optical path of the light beam emitted from the light beam scanning device; a shutter driving portion for moving the shutter member to the open position at the time the photosensitive material is exposed by the light beam scanning device, and moving the shutter member to the cut-off position at the time exposure for the photosensitive material is stopped; a chassis member on which the shutter member and the shutter driving portion are mounted; and a vibration cut-off portion which prevents transmission of a vibration from the chassis member to the light beam scanning device.

In accordance with a second aspect of the present invention, in the device of the first aspect, the light beam scanning device and the chassis member are supported by a supporting structure, the vibration cut-off portion is disposed at least one of between the chassis member and the supporting structure and between the light beam scanning device and the supporting structure.

In accordance with a third aspect of the present invention, in the device according to one of the first and second aspects, the shutter member is formed into an elongated plate extending in a main scanning direction in which the light beam is deflected by the light beam scanning device, and is supported swingably around a supporting shaft provided at one end thereof in a widthwise direction between the cut-off position and the open position.

In accordance with a fourth aspect of the present invention, in the device according to one of the first to third aspects, the chassis member has a cooling fan mounted thereon, the cooling fan cooling the shutter driving portion by air flow generated thereby and restraining a change of temperature in a space including the optical path of the light beam emitted from the light beam scanning device.

In accordance with a fifth aspect of the present invention, the device according to one of the first to fourth aspects further comprises a position sensor for detecting the shutter member located at one of the cut-off position and the open position; a setting section for setting a moving amount of the shutter member, by which the shutter member detected by the position sensor and located at the one of the cut-off position and the open position reaches the other of the cut-off position and the open position; and a shutter control section for controlling the shutter driving portion so that the shutter member moves by the moving amount of the shutter member, which is set by the setting section, when the shutter member moves from the one of the cut-off position and the open position to the other.

In accordance with a sixth aspect of the present invention, in the device according to the first aspect, the light beam scanning device and the chassis member are respectively supported by supporting structures, the vibration cut-off portion is disposed between the supporting structures.

In accordance with a seventh aspect of the present invention, there is provided a light beam cut-off device which comprises: a shutter member disposed outside of a light beam scanning device which emits a light beam and between the light beam scanning device and a photosensitive material exposed by a light beam emitted from the light beam scanning device, and supported in a movable manner between a cut-off position at which an optical path of the light beam emitted from the light beam scanning device is cut off by the shutter member, and an open position at which the shutter member retreats from the optical path of the light beam emitted from the light beam scanning device; a shutter driving portion for moving the shutter member to the open position at the time the photosensitive material is exposed by the light beam scanning device, and moving the shutter member to the cut-off position at the time exposure for the photosensitive material is stopped; and a chassis member on which the shutter member and the shutter driving portion are mounted, wherein the shutter member is formed into an elongated plate extending in a main scanning direction in which the light beam is deflected by the light beam scanning device, and is supported swingably around a supporting shaft provided at one end thereof in a widthwise direction between the cut-off position and the open position.

In accordance with an eighth aspect of the present invention, in the device according to the seventh aspect, the device further comprises a vibration cut-off portion which prevents transmission of a vibration from the chassis member to the light beam scanning device.

In accordance with the light beam cut-off device of the present invention, first, at the time exposure for the photosensitive material is carried out, the shutter driving portion moves the shutter member to the open position at which the shutter member retreats from the optical path of the light beam emitted from the light beam scanning device. At the time exposure for the photosensitive material is stopped, the shutter member is moved to the cut-off position at which the optical path of the light beam emitted form the light beam scanning device is cut off. As a result, at the time exposure for the photosensitive material is carried out, the light beam emitted from the light beam scanning device is made incident on the photosensitive material without being cut off by the shutter member and the photosensitive material can be exposed to the light beam. Further, at the time exposure for the photosensitive material is stopped, even if the light beam is emitted from the light beam scanning device, the light beam is cut off by the shutter member located at the cut-off position. Accordingly, occurrence of fogging in the photosensitive material can be reliably prevented.

Further, the vibration cut-off portion prevents transmission of a vibration from the chassis member on which the shutter member and the shutter driving portion, which may generate vibratory force, are mounted, to the light beam scanning device. As a result, it is possible to prevent deterioration of image quality due to fluctuation of a light beam on the photosensitive material due to a vibration from the chassis member.

In a case in which the light beam scanning device and the chassis member are supported by a common supporting structure, the vibration cut-off portion can be constituted from a vibration absorber such as vibration-proof (isolation) rubber interposed between the chassis member and the supporting structure and/or between the light beam scanning device and the supporting structure. Further, in a case in which the light beam scanning device and the chassis member are respectively supported by physically separated supporting structures, the vibration absorber such as vibration-proof rubber may be interposed between the plurality of supporting structures.

BRIEF DESCRIPTION OF THE DRAWINGS

FIGS. 8A and 8B are timing charts showing the relation between an operation of conveying a photosensitive material by the laser printer section shown in FIG. 2, and an open-close state of the shutter member.

DESCRIPTION OF THE PREFERRED EMBODIMENTS

Referring now to the attached drawings, a digital photographic printer to which a light beam cut-off device according an embodiment of the present invention is applied will be described hereinafter.

[Structure]

Figure 1:
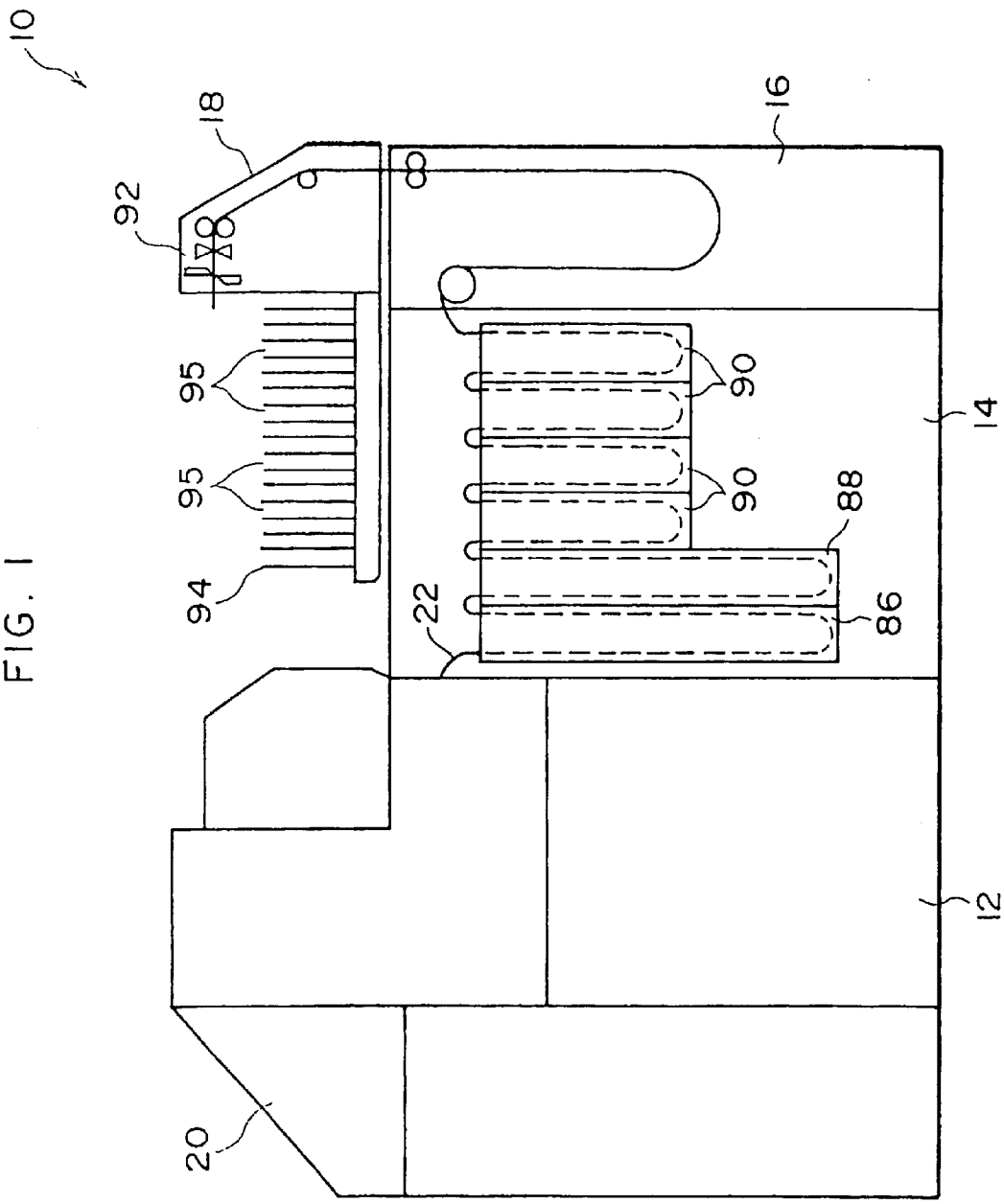
FIG. 1 is a side view showing the structure of a photographic printer to which a light beam scanning device according to an embodiment of the present invention is applied.

FIG. 1 shows a digital photographic printer provided with a light beam cut-off device according to the embodiment of the present invention. The digital photographic printer (hereinafter referred to simply as "photographic printer") 10 is used as a film image input/output system including an image input device comprised mainly of a film scanner and an image processor, and an image output device comprised of a laser printer and a film processor, a so-called image output device in a digital minilab. A photosensitive material 22 is exposed by scanning to a light beam modulated in accordance with image information read by the film scanner from a frame region of a photographic film and a latent image is formed thereon. The photosensitive material 22 is subjected to developing processing and a photographic print with an image of the film recorded thereon is outputted. The photographic printer 10 includes, as shown in FIG. 1, a laser printer section 12, a processor section 14, a dryer section 16, a print discharging section 18, and an electrical equipment section 20 in which a control substrate, a power source and the like are accommodated.

Figure 2:
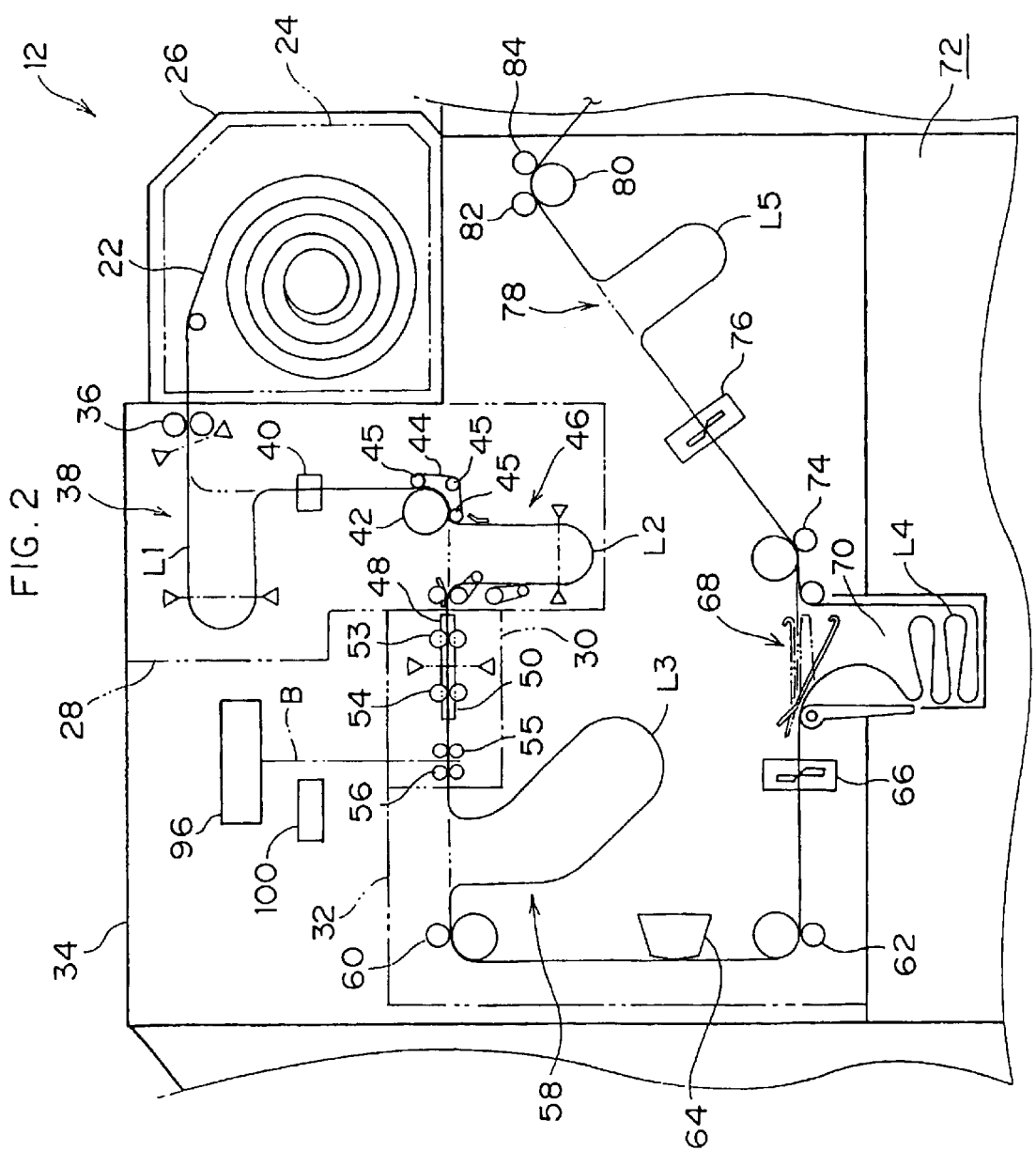
FIG. 2 is a cross-sectional side view showing the structure a laser printer section in the photographic printer shown in FIG. 1.

The laser printer section 12 is provided with a magazine loading portion 26 in which a magazine 24 with the photosensitive material 22 wound into the form a roll as shown in FIG. 2 is detachably mounted. A supplying-conveying portion 28, a sub-scanning conveying portion 30 and a discharging-conveying portion 32 by which the photosensitive material 22 pulled out from the magazine loading portion 26 is conveyed along a predetermined conveying path are provided sequentially from the upstream side in the direction in which the photosensitive material is conveyed. Among these conveying portions, the conveying portions 28 and 30 each sequentially pass the photosensitive material 22 to a downstream conveying portion. The discharging-conveying portion 32 located at the lowermost position at the downstream side conveys the photosensitive material 22 with a latent image formed thereon from the laser printer 12 to the processor section 14.

First, the supplying-conveying portion 28 in the laser printer section 12 will be described. As shown in FIG. 2, the supplying-conveying portion 28 is provided with a feed roller pair 36 for pulling out the photosensitive material 22 from the magazine 24, and a first loop forming portion 38 which is provided at the downstream side of the feed roller pair 36 and in which a first loop portion L1 is formed on the photosensitive material 22 by bending the photosensitive material 22 in the direction of the thickness thereof. A puncher 40 for recording image position information on the photosensitive material 22 is provided at the downstream side of the first loop forming portion 38.

The puncher 40 forms punch holes on the photosensitive material 22, which correspond to image position information such as position information (so-called frame information) for each print, or position information (so-called sort information) for a unit number of sheets suitably set for one roll film of 24 exposures, 36 exposures or the like for the purpose of cutting the photosensitive material 22 in the print discharging section 18, which will be described later, or for the purpose of exposure or back printing. In this case, the puncher 40 temporarily stops conveying of the photosensitive material 22 during the operation thereof. However, a variation in the speed of the photosensitive material 22 caused by the puncher 40 is eliminated due to the loop portion L1 formed at the upstream side of the puncher 40.

A conveying roller 42 and an endless conveying belt 44 are provided at the downstream side of the puncher 40. The conveying belt 44 is stretched by three rolls 45 so as to contact by pressure a roller surface of the conveying roller 42. The conveying path of the photosensitive material 22 is bent substantially perpendicularly by the conveying roller 42 and the conveying belt 44 and the photosensitive material 22 is continuously conveyed further to the downstream side. A second loop forming portion 46 for forming a second loop portion L2 on the photosensitive material 22 is provided between the conveying roller 42 and the sub-scanning conveying portion 30 in the same manner as in the first loop forming portion 38.

In the second loop forming portion 46, the second loop portion L2 is formed on the photosensitive material 22 at the upstream side of the sub-scanning conveying portion 30 at the time conveying of the photosensitive material 22 is started, and the second loop portion L2 is held until exposure is completed. As a result, even when the speed at which the photosensitive material 22 is conveyed in the supplying-conveying portion 28 and the speed at which the photosensitive material 22 is conveyed in the sub-scanning conveying portion 30 are different from each other, the difference of conveying speed is eliminated by the second loop portion L2. Therefore, the tension of the photosensitive material 22 in the supplying-conveying portion 28 is not transmitted to the photosensitive material 22 conveyed in the sub-scanning conveying portion 30. Further, a vibration of the supplying-conveying portion 28 is difficult to be transmitted via the photosensitive material 22 to the sub-scanning conveying portion 30 due to the second loop portion L2.

Next, the sub-scanning conveying portion 30 disposed at the downstream side of the supplying-conveying portion 28 will be described. A pair of guide members 48 and 50 are disposed at an inlet of the sub-scanning conveying portion 28 as shown in FIG. 2, and a slit-shaped conveying path for guiding the photosensitive material 22 to an exposure position by a laser beam B is formed between the guide members 48 and 50. The guide members 48 and 50 are provided with a resist roller pair 53 and a resist roller pair 54 which are located at the upstream and downstream sides thereof, respectively, in the direction in which the photosensitive material 22 is conveyed. A nip roller pair 55 and a nip roller pair 56 are disposed at the downstream side of the guide members 48 and 50 sequentially from the upstream side in the conveying direction.

A light beam scanning device 96 for exposing the photosensitive material 22 is provided above the sub-scanning conveying portion 30. The light beam scanning device 96, while deflecting a laser beam B of three primary colors modulated in accordance with digital image data inputted from an image processor (not shown) in a main scanning direction, causes the laser beam B to scan the photosensitive material 22 conveyed by the nip roller pairs 55 and 56.

The space between the nip roller pair 55 and the nip roller pair 56 in the sub-scanning conveying portion 30 along the conveying direction (a sub-scanning direction) is made sufficiently narrow. The light beam scanning device 96 deflects the laser beam B in the main scanning direction, and at the same time, applies the laser beam B to the photosensitive material 22 between the nip rollers 55 and 56. At this time, the nip rollers 55 and 56 rotate by a torque from a stepping motor (not shown). The stepping motor rotates by an amount corresponding to a pixel density along the sub-scanning direction in synchronization with the time when one scanning by the light beam scanning device 96 is completed during exposure-scanning for the photosensitive material 22. As a result, the photosensitive material 22 is exposed by scanning to the laser beam B in a two-dimensional manner and a latent image is formed thereon.

A light beam cut-off device 100 is disposed between the sub-scanning conveying portion 30 and the light beam scanning device 96 as shown in FIG. 2. The light beam cut-off device 100 is provided so as to prevent the photosensitive material 22 from being exposed to the laser beam B at the time exposure for the photosensitive material 22 is stopped. The detailed structures of the light beam scanning device 96 and the light beam cut-off device 100 will be described later.

Next, the discharging-conveying portion 32 disposed at the downstream side of the sub-scanning conveying portion 30 will be described. As shown in FIG. 2, a third loop forming portion 58 for forming a third loop portion L3 on the photosensitive material 22 is provided at the upstream side of the discharging-conveying portion 32. In the third loop forming portion 58, the third loop portion L3 is formed on the photosensitive material 22 at the downstream side of the sub-scanning conveying portion 30, and the third loop portion L3 is held until exposure for the photosensitive material 22 is completed. As a result, even when the speed at which the photosensitive material 22 is conveyed in the discharging-conveying portion 32 and the speed at which the photosensitive material 22 is conveyed in the sub-scanning conveying portion 30 is different from each other, the difference in the conveying speed is eliminated by the third loop portion L3. Therefore, the tension of the photosensitive material 22 in the supplying-conveying portion 28 is not transmitted to the photosensitive material 22 in the sub-scanning conveying portion 30.

As shown in FIG. 2, a conveying roller pair 60 and a conveying roller pair 62 are sequentially disposed at the downstream side of the third loop forming portion 58 and a back printer 64 is provided so as to abut against a rear surface of the photosensitive material 22 stretched by the conveying roller pairs 60 and 62. The back printer 64 allows various data including a photographing date of an original film, a record date for the photosensitive material 22 to be printed on a reverse side of a frame region on the photosensitive material 22.

A first cutter 66 and a reservoir 68 are provided at the downstream side of the conveying roller pair 62. The first cutter 66 is not used in an ordinary operating state. For example, when the photosensitive material 22 which forms a fourth loop portion L4 is discharged from a loop storing portion 70 in the reservoir 68 after an exposure operation is completed, the first cutter 66 cuts off the photosensitive material 22 at the downstream side of the loop storing portion 70. Further, in the reservoir 68, after exposure for the photosensitive material 22 by the light beam scanning device 96 starts and before developing processing for the photosensitive material 22 by the processor section 14 starts, the exposed photosensitive material 22 is accommodated in the loop storing portion 70 in the form of a loop so as to eliminate a difference between an exposure speed of the photosensitive material 22 in the laser printer section 12 and a developing speed thereof in the processor section 14.

A conveying roller pair 74, a second cutter 76 and a fifth loop forming portion 78 are provided at the downstream side of the reservoir 68 sequentially from the upstream side in the conveying direction. The second cutter 76 is used to cut out the photosensitive material 22 when, for example, trouble may be caused in the conveying of the photosensitive material 22. For example, when the amount of the photosensitive material 22 accommodated in the reservoir 68 is a predetermined value or less, or when a trouble is caused in the processor section 14 or the like, the photosensitive material 22 is cut by the second cutter 76, which makes it possible to eliminate an adverse effect exerted on the exposed photosensitive material 22 accommodated in the loop storing portion 70 of the reservoir 68 or prevent the conveying portions 28, 30 and 32 from being damaged due to the photosensitive material 22 being inadvertently pulled by the processor section 14.

The fifth loop forming portion 78 is used to prevent the photosensitive material 22 from being damaged by being inadvertently pulled by the processor section 14 during the operation of the second cutter 76 because the photosensitive material 22 is temporarily stopped during the operation of the second cutter 76. A discharging roller 80 having a relatively large diameter, and two nip rollers 82 and 84 in contact with a roller surface of the discharging roller 80 are provided at the downstream side of the fifth loop forming portion 78. The photosensitive material 22 is conveyed by these rollers 80, 82 and 84 from the laser printer section 12 to the processor section 14.

The processor section 14 includes a developing tank 86, a fixing tank 88, and washing tanks 90 are disposed sequentially along the conveying path of the photosensitive material 22 as shown in FIG. 1. In the processor section 14, the photosensitive material 22 is subjected to developing and fixing processing in such a manner as to be sequentially immersed in a developing solution of the developing tank 86 and in a fixing solution of the fixing tank 88, and thereafter, rinsed with water in the washing tanks 90 to remove the developing solution and the fixing solution therefrom. After completion of the rinsing, the photosensitive material 22 is conveyed to the dryer section 16 and dried with hot air therein, and further conveyed from the dryer section 16 to the print discharging section 18.

The print discharging section 18 includes, as shown in FIG. 1, a print cutter 92 disposed above the dryer section 16 and a sorter unit 94 disposed above the processor section 14. The photosensitive material 22 conveyed from the dryer section 16 to the print discharging section 18 is cut out by the print cutter 92 for each print and discharged from the print cutter 92 to the sorter unit 94. The sorter unit 94 is provided with a plurality of print receiving portions 95 and automatically sorts prints discharged from the print cutter 92 into predetermined receiving portions 95.

Figure 3:
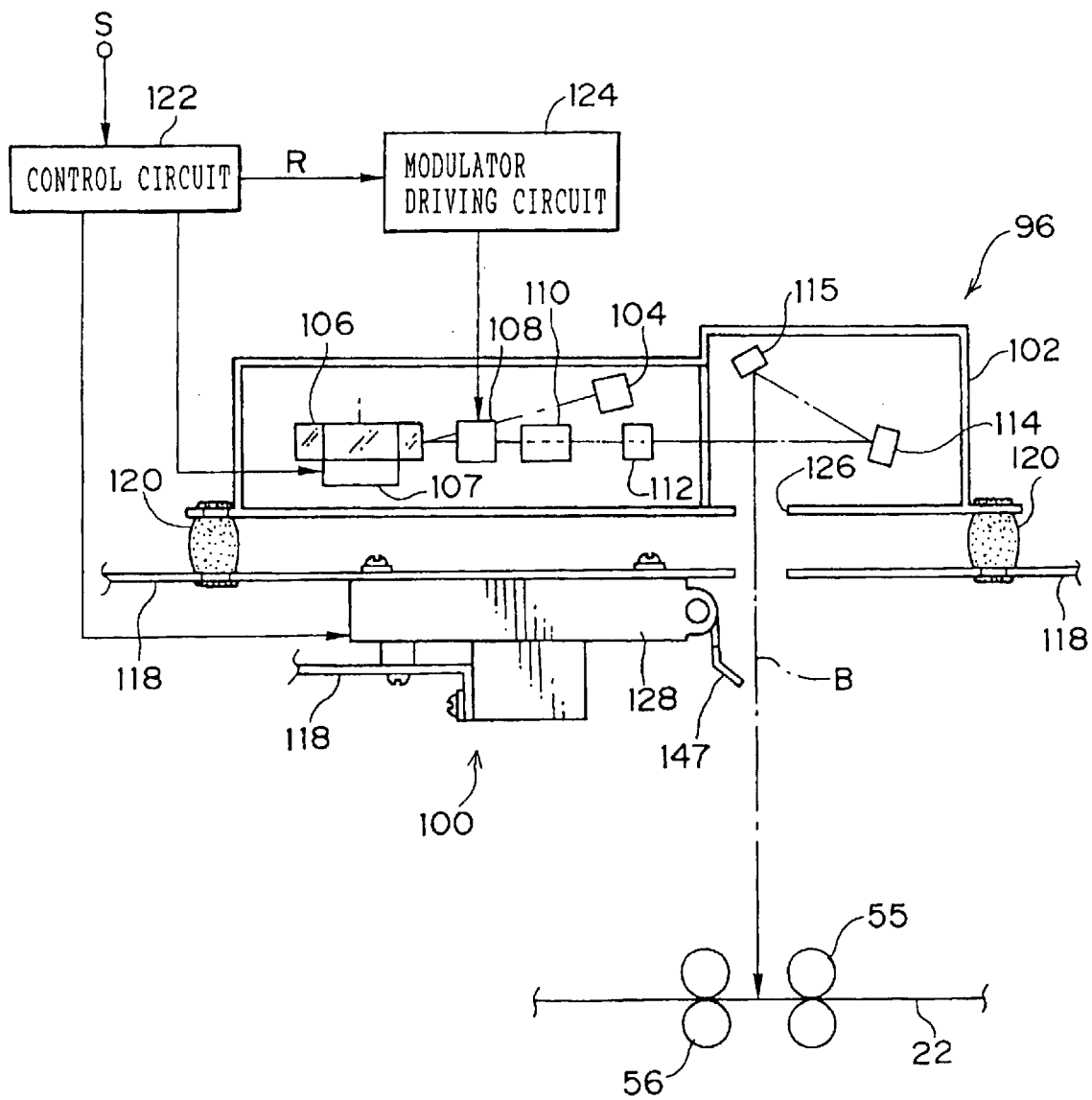
FIG. 3 is a side view showing structures of a light beam scanning device, a light beam cut-off device and a control section in the laser printer section shown in FIG. 2, which shows a state in which a shutter member of the light beam cut-off device is located at an open position.

Next, the structures of the light beam scanning device 96 and the light beam cut-off device 100 will be described. As shown in FIG. 3, the light beam scanning device 96 is provided with an optical box 102 serving as an outer case portion. The optical box 102 is formed as a dust-proof structure which prevents intrusion of dusts and the like from outside. Provided in the optical box 102 are a laser light source 104 which is a light source of the laser beam B, a polygon mirror 106 and a polygon motor 107 for deflecting the laser beam B outputted form the laser light source 104, a light modulator 108 such as an acousto-optic modulator (AOM) for modulating the laser beam B, an fθ lens 110, a cylindrical lens 112, and return mirrors 114 and 116.

Further, the optical box 102 is mounted on and supported by a main body frame portion 118 in the laser printer section 12 as shown in FIG. 3. The main body frame portion 118 is formed as a structure for supporting not only the light beam scanning device 96 but also other units which constitutes the laser printer section 12, for example, the sub-scanning conveying portion 30, the reservoir 68 and the like. For this reason, the light beam scanning device 96 is mounted on the main body frame portion 118 via vibration-proof rubbers 120. The vibration-proof rubbers 120 prevent vibrations from the other units from being transmitted to the light beam scanning device 96 via the main body frame portion 118.

As shown in FIG. 3, the photographic printer 10 includes a control circuit 122 for controlling the entire laser printer section 12. A stepping motor (not shown) for rotating the laser light source 104, the polygon motor 107, and the nip roller pairs 55 and 56 is controlled to be driven by the control circuit 122. Further, the light modulator 108 is driven by a modulator driving circuit 124 which receives an image signal S from an image input device (not shown), and the laser beam B emitted from the laser light source 104 is modulated in accordance with the image signal S.

In the light beam scanning device 96, the modulated laser beam B is deflected by the polygon mirror 106. The laser beam B is emitted out of a window portion 126 provided in the optical box 102 and main scanning of the laser beam B is performed on the photosensitive material 22. At the same time, the photosensitive material 22 is conveyed by the nip roller pairs 55 and 56 at a fixed speed and sub-scanning by means of the laser beam B is performed thereon. The photosensitive material 22 is thus exposed by scanning to the modulated laser beam B in a two-dimensional manner. Therefore, a continuous-tone image which the image signal S bears is formed, as a latent image, on the photosensitive material 22. Thereafter, the photosensitive material 22 is conveyed from the laser printer section 12 to the processor section 14 and subjected to developing processing therein. As a result, a latent image is made visible and formed into a photographic print.

The aforementioned light beam scanning device 96 has no built-in shutter mechanism which cuts off the laser beam B to prevent the laser beam B from escaping from the optical box 102. Further, the light beam scanning device 96 is provided with three laser light sources corresponding to lasers of three colors, red (R), green (G) and blue (B) (in FIG. 3, only one laser light source 104 is shown) as the laser light source 104.

A laser diode (LD) or the like is used as the laser light source of R, and a second harmonic generation (SHG) is used as the laser light sources of G and B. Since the SHG laser utilizes a second harmonic, a certain degree of time is required until the output of the laser beam is made stable. For this reason, during operation of the photographic printer 10, the laser light source 104 is fed with a minimum amount of driving current corresponding to a base output even when no latent image is being formed on the photosensitive material 22, and the output of the laser beam can be made stable in a short time. Accordingly, even when no latent image is being formed on the photosensitive material 22, the laser beam B of a very low level which is less than or equal to a white (W) level which is a laser intensity corresponding to a white region of a latent image is outputted from the laser light sources of G and B. Even if the laser beam of the very low level is applied to the photosensitive material 22 being conveyed at a sub-scanning speed, no fogging occurs. However, when the laser beam B is continuously illuminated on a specific region of the photosensitive material 22 in a stopped state, fogging occurs therein.

Figure 5:
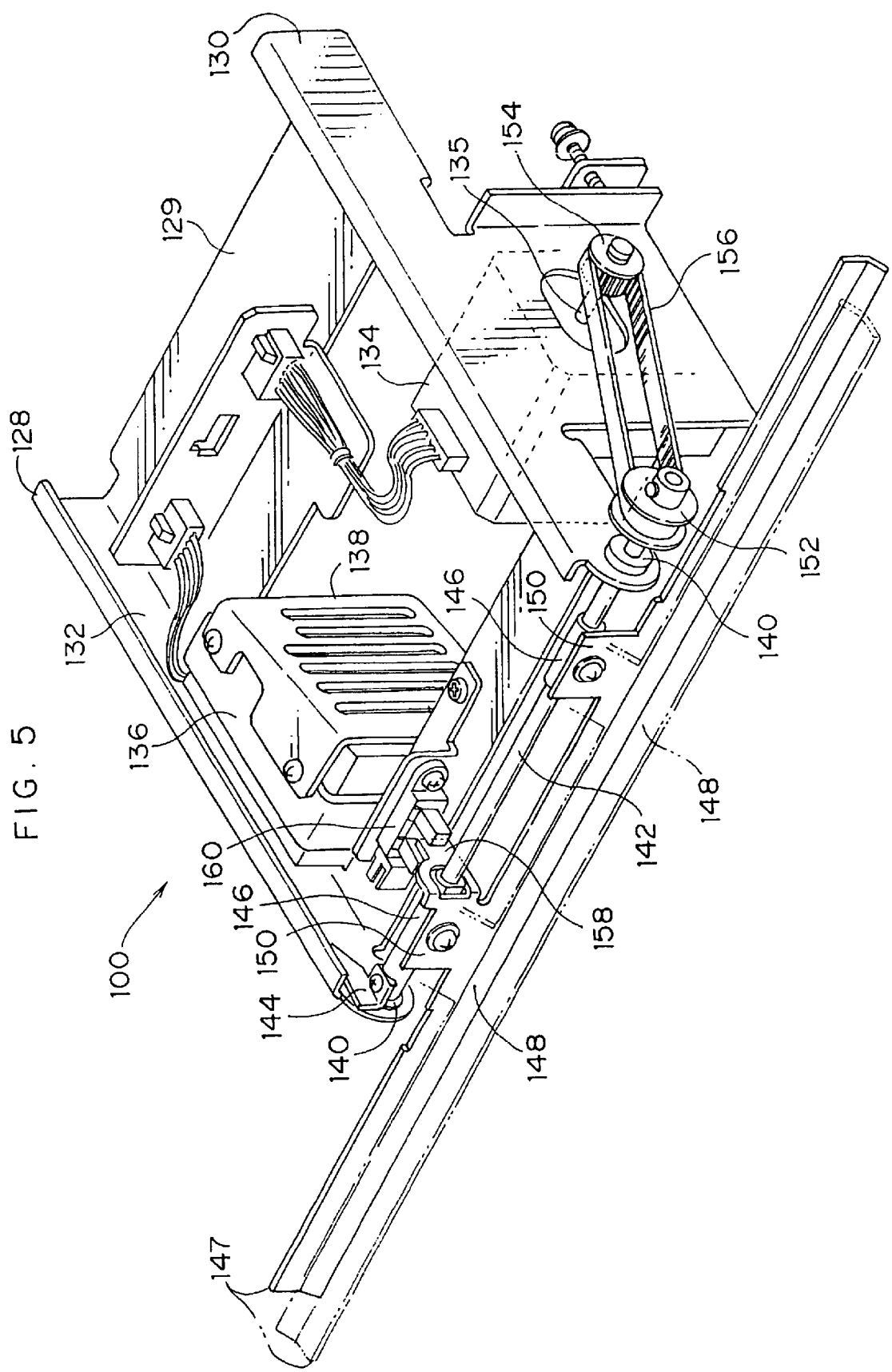
FIG. 5 is a perspective view showing the structure of a light beam cut-off device according to the embodiment of the present invention.
Figure 6:
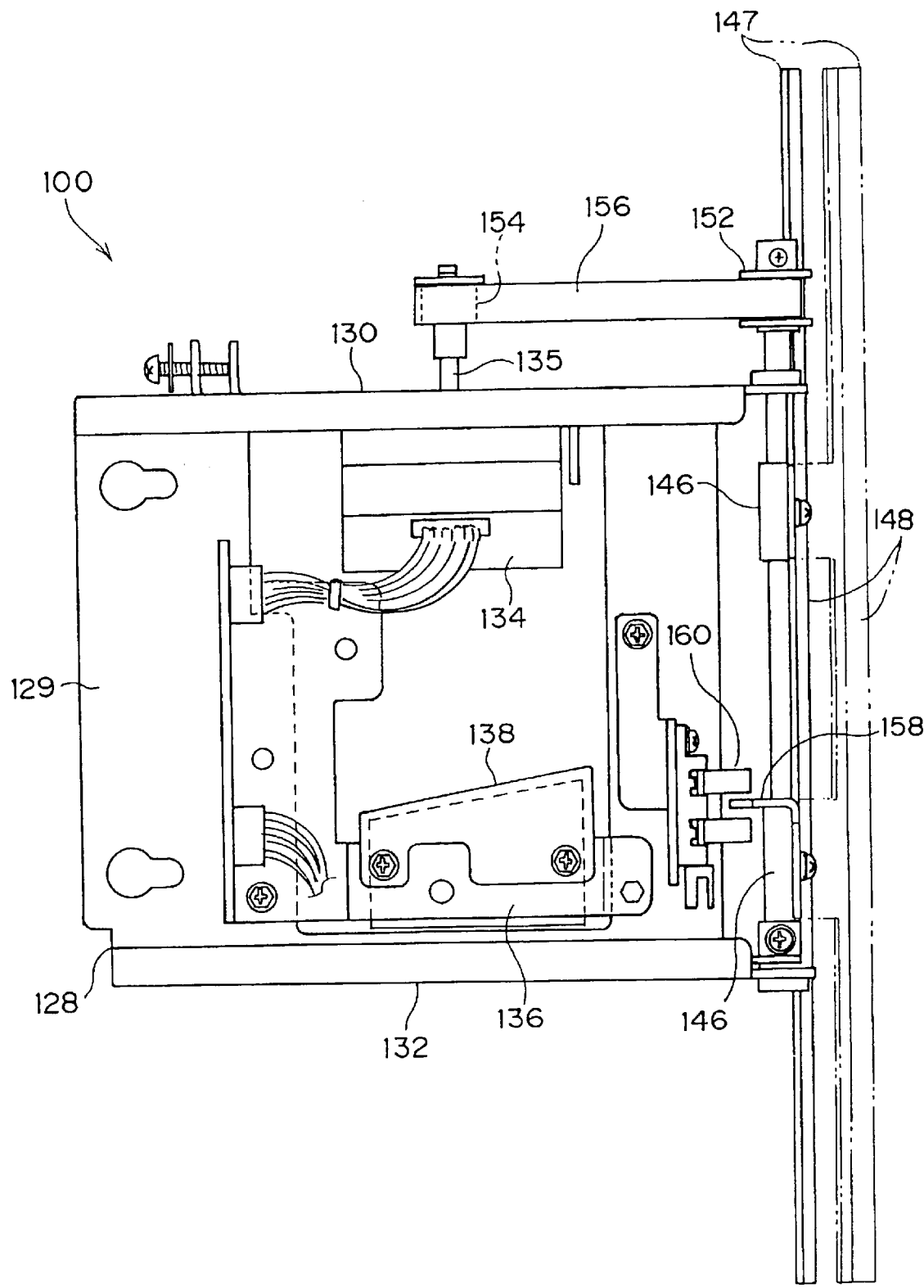
FIG. 6 is a plan view showing the structure of the light beam cut-off device according to the embodiment of the present invention.

In the photographic printer 10, the light beam cut-off device 100 is provided below the light beam scanning device 96 so as to prevent occurrence of fogging in the photosensitive material 22. The light beam cut-off device 100 is, as shown in FIGS. 5 and 6, provided with a supporting frame 128 formed by bending a metal plate such as a stainless steel plate. The supporting frame 128 includes side plate portions 130 and 132, which are bent, formed at both ends thereof in the main scanning direction so as to be parallel with each other. A stepping motor 134 is fastened by a screw on an internal surface of the side plate portion 130 (located at the right side of FIG. 5), which faces the other side plate portion 132. A cooling fan 136 is fastened by a screw on an internal surface of the side plate portion 132, which faces the side plate portion 130. A rectifying plate 138, which has a plurality of slit-shaped opening portions extending in the heightwise direction, is provided at an air-blow opening of the cooling fan 136. The rectifying plate 138 rectifies air flow generated by the cooling fan 136 and blows the same against the stepping motor 134, and further causes the air flow to be circulated in a space including the optical path of the laser beam B between the light beam scanning device 96 and the photosensitive material 22. As a result, the stepping motor 134 is air-cooled so as not to be heated, and an atmospheric temperature in the space including the optical path of the laser beam B between the light beam scanning device 96 and the photosensitive material 22 is made uniform.

Further, bearings 140 are mounted coaxially at respective one ends of the pair of side plate portions 130 and 132. A round bar-shaped supporting shaft 142 is rotatably supported by the bearings 140. The axial center of the supporting shaft 142 is made parallel to the main scanning direction. A stopper plate 144 is, as shown in FIG. 5, fixed to the supporting shaft 142 at a position slightly inward from the edge of the side plate portion 132, and limits the angle at which the supporting shaft 142 can be rotated in a predetermined range.

The supporting shaft 142 is provided with connecting portions 146, of which each diametrical dimension is larger than that of the supporting shaft 142, at inner sides of the side plate portions 130 and 132 and at positions which are symmetrical to each other in the axial direction thereof. A shutter member 147 is connected to the pair of connecting portions 146 so as to cut off the laser beam B between the light beam scanning device 96 and the photosensitive material 22 when no latent image is made to form on the photosensitive material 22. The shutter member 147 is provided with a cut-off portion 148 in the shape of a plate extending in the main scanning direction. The cut-off portion 148 is bent along the widthwise direction thereof so as to have a substantially V-shaped configuration which is opened upward in a cross sectional view. The shutter member 147 also includes a pair of stay portions 150 extending toward the supporting shaft 142 from one end surface thereof in the widthwise direction. The pair of stay portions 150 are respectively fastened via screws to the pair of connecting portions 146 each at the end thereof. As a result, the shutter member 147 is connected to the supporting shaft 142 and supported thereby so as to be swingable around the supporting shaft 142.

Figure 4:
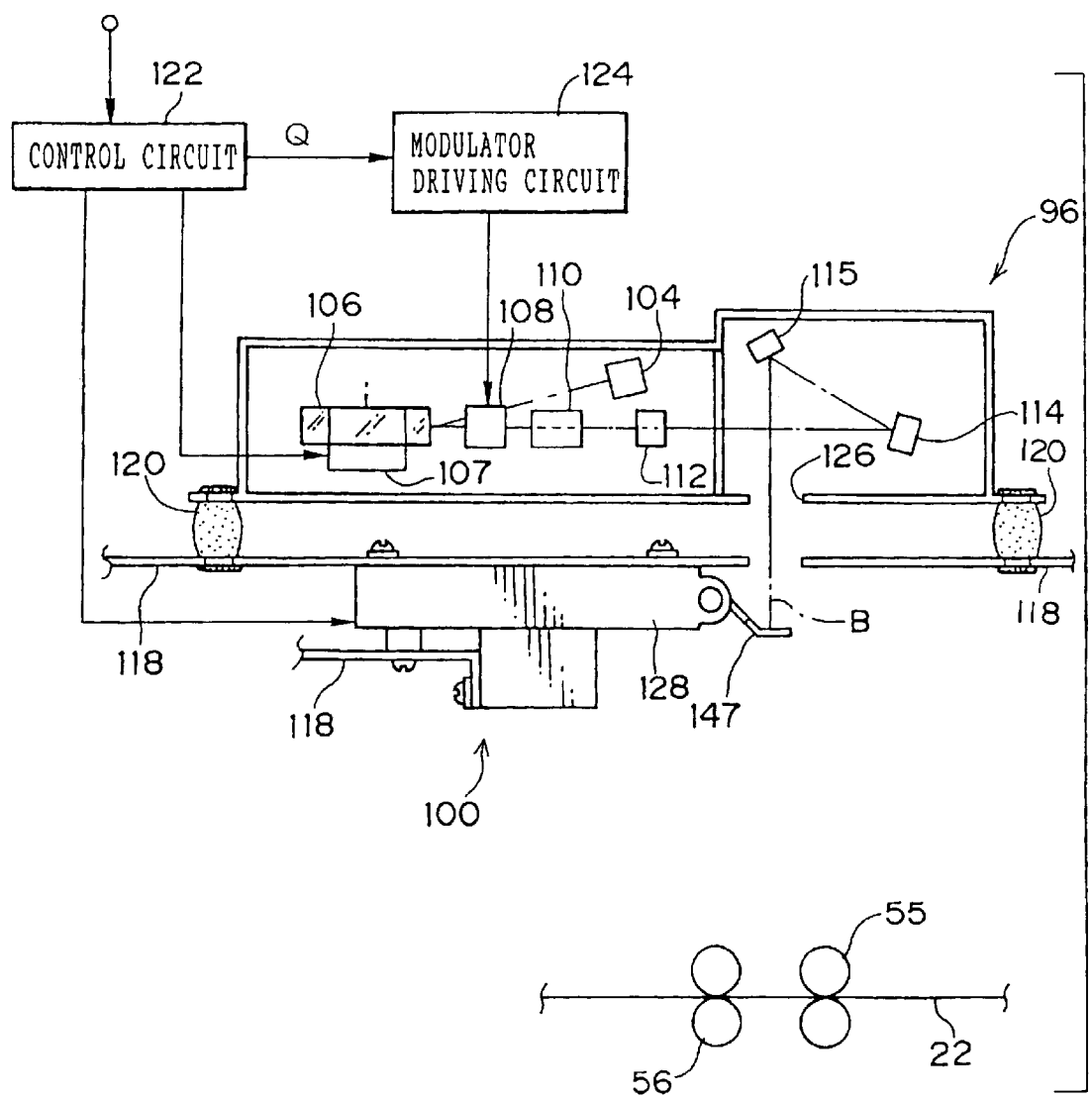
FIG. 4 is a side view showing the structures of the light beam scanning device, light beam cut-off device and control section in the laser printer section shown in FIG. 2, which shows a state in which the shutter mechanism of the light beam cut-off device is located at a cut-off position.

The shutter member 147 is made swingable around the supporting shaft 142, which is provided so as to rotate in the range limited by the stopper plate 144, between the open position shown in FIG. 3 and the cut-off position shown in FIG. 4. As shown in FIG. 3, the shutter member 147 located at the open position causes the cut-off portion 148 to retreat (move away) from the optical path of the laser beam B emitted from the light beam scanning device 96. As shown in FIG. 4, the shutter member 147 located at the cut-off position causes the laser beam B emitted from the light beam scanning device 96 to be cut off by the cut-off portion 148.

Further, as shown in FIGS. 5 and 6, a driven pulley 152 is coaxially fixed at one end of the supporting shaft 142 for supporting the shutter member 147, and a driving pulley 154 is coaxially fixed at a driving shaft 135 of the stepping motor 134. These pulleys 152 and 154 are connected by a timing belt 156 made of resin. As a result, the stepping motor 134, during the operation thereof, transmits a torque to the supporting shaft 142 via the driving pulley 154, the timing belt 156 and the driven pulley 152, thereby causing the shutter member 147 to swing to the open position or to the cut-off position.

In the shutter member 147, a striker portion 158 is, as shown in FIG. 5, formed by bending from one of the stay portions 150 (at the left side of FIG. 5) and extending along a radial direction of the supporting shaft 142. A position sensor 160 is disposed on a bottom plate 129 of the supporting frame 128 between the pair of side plate portions 130 and 132 so as to correspond to the striker portion 158. The position sensor 160 is comprised of a magnetic sensor, and when a magnetic path is cut off by the striker portion 158, the sensor is turned on and outputs a detection signal to the control circuit 122 (see FIG. 3). The striker portion 158 is provided so as to turn on the position sensor 160 when the shutter member 147 is, as shown in FIG. 5, made to swing to the open position.

When the detection signal is inputted from the position sensor 160 to the control circuit 122, it is determined that the shutter member 147 is disposed at the open position. Further, the photographic printer 10 is provided with a keyboard and a display section (which are both not shown), which serve as an operating portion and an information display portion, respectively, used by a service worker who carries out device maintenance or the like. By carrying out a predetermined operation for the keyboard and the display section, an amount by which the shutter member 147 swings from the open position to the cut-off position can be set at an arbitrary value for the control circuit 122. The control circuit 122 calculates the number of driving pulse corresponding to the set amount by which the shutter member 147 swings. When the shutter member 147 is moved from the open position to the cut-off position, the control circuit 122 outputs the driving pulse to the stepping motor 134 by a calculated value. As a result, the shutter member 147 swings precisely by an amount of swinging set in the control circuit 122 with the open position serving as an original position, and thereafter, stops swinging.

When the amount by which the shutter member 147 swings from the open position to the cut-off position, which is set for the control circuit 122, can be set at an arbitrary value in such a manner as described above, the amount by which the shutter member 147 swings can be adjusted so that the laser beam B emitted from the light beam scanning device 96 is reliably cut off by the shutter member 147 moving from the open position to the cut-off position. Further, even when the type of the light beam scanning device 96 applied to the photographic printer 10 is altered, the amount by which the shutter member 147 swings can be simply adjusted correspondingly to the newly applied light beam scanning device 96.

The supporting frame 128 of the light beam cut-off device 100 is fastened and fixed via a plurality of screws to the lower surface of the main body frame portion 118 in which the light beam scanning device 96 is mounted on the upper surface side thereof, and is supported by the main body frame portion 118. In the light beam cut-off device 100, during the operation of the stepping motor 134 mounted on the supporting frame 128, a vibration is generated from the stepping motor 134 and inertia force accompanied by adjustment of the speed of the shutter member 147 acts as vibratory force. As a result, a vibration is also generated from the cooling fan 136. Such vibration or vibratory force is transmitted via the supporting frame 128 to the main body frame portion 118 to vibrate the main body frame portion 118. However, the light beam scanning device 96 is mounted on the main body frame portion 118 via the vibration-proof rubbers 120, and therefore, a vibration from the light beam cut-off device 100 is cut off by the vibration-proof rubbers 120.

[Operation]

Next, the operation of the photographic printer 10 equipped with the light beam cut-off device 100 according to the present embodiment having the above-described structure will be described. In the photographic printer 10, so long as image signals S which bear image data of a plurality of continuous images are sequentially supplied, these images are sequentially recorded on the elongated photosensitive material 22 along the longitudinal direction of the material. In this case, it is unnecessary to stop the photosensitive material 22 being conveyed at a constant speed.

In a case in which an image signal S which bears image data of an image to be subsequently recorded is not immediately supplied at the time recording of an image is completed, conveying of the photosensitive material 22 is stopped so as to prevent the photosensitive material 22 from being wastefully consumed. A conveying operation of the photosensitive material 22 in the aforementioned case will be described hereinafter with reference to FIGS. 7A, 7B, 7C, 8A and 8B.

FIG. 8A is a timing chart which shows, with the passage of time, the change of conveying speed V when conveying of the photosensitive material 2 is stopped. At the time one image is recorded, the conveying speed V is maintained at a fixed speed V0. After recording of the image is completed at the time T0, when a signal Q, which indicates that an image signal S corresponding to an image to be subsequently recorded is not inputted, is inputted from the modulator driving circuit 124 to the control circuit 122 at the time T1, the control circuit 122 applies the brakes on the nip roller pairs 55 and 56 to stop, and subsequently, drives to rotate the nip roller pairs 55 and 56 in the opposite direction.

In this case, due to the inertia of the driving system, the conveying speed V of the photosensitive material 22 gradually decreases from V0 and comes to zero at the time T2. Thereafter, the conveying speed of the photosensitive material 22 conveyed in a backward direction gradually increases to a predetermined value, that is, −V0. The control circuit 122 causes the photosensitive material 22 to be continuously conveyed in the backward direction at the speed V0 for a predetermined time, and stops the backward conveying of the photosensitive material at the time T3. The photosensitive material 22 is conveyed backward due to its own inertia, and thereafter, stops completely at the time T4.

Figure 7A:
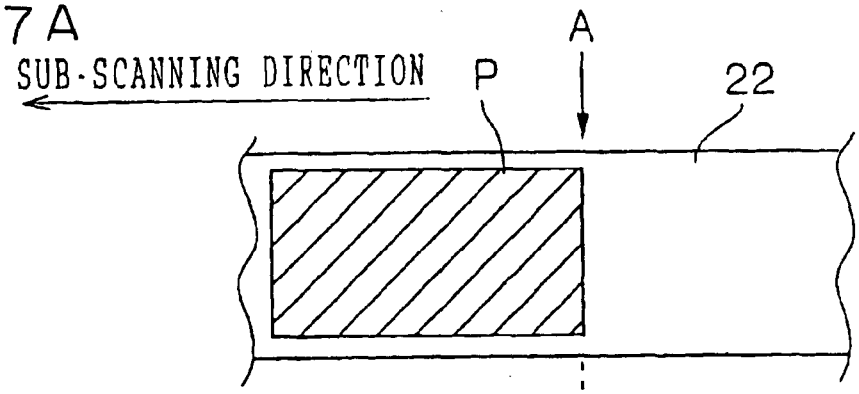
FIGS. 7A, 7B and 7C are plan views of a photosensitive material, each showing the relation between an operation of conveying the photosensitive material by the laser printer section shown in FIG. 2, and an image region.
Figure 7B:
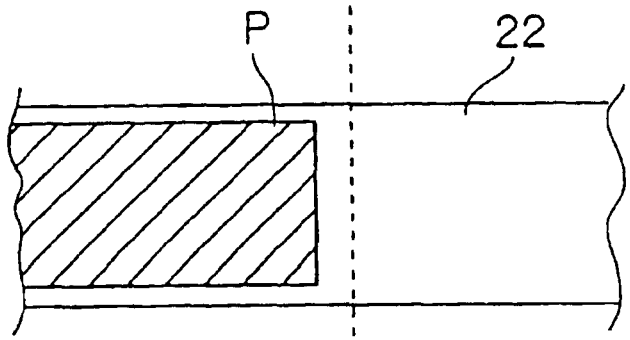
Figure 7C:
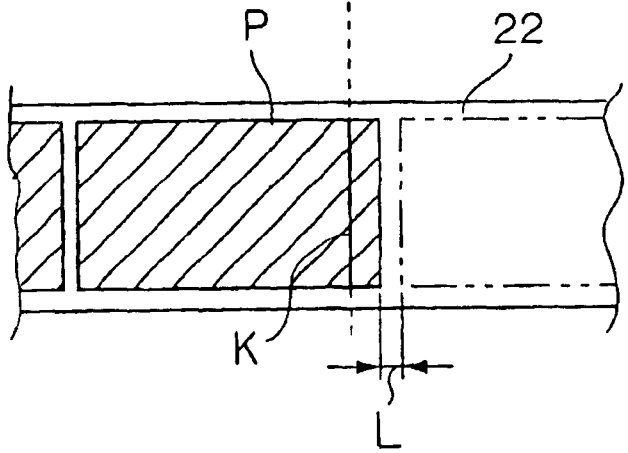

The aforementioned conveying operation of the photosensitive material 22 is shown in FIGS. 7A to 7C. In FIGS. 7A to 7C, a hatched square region on the photosensitive material 22 indicates a recorded image P, and a main scanning position at which main scanning is performed by the laser beam B is indicated by arrow A. FIG. 7A shows the position of the photosensitive material 22 at the time recording of the image P is just completed. FIGS. 7B and 7C show the positions of the photosensitive material 22 at the time T2 and T4. As shown in the drawing, the photosensitive material 22 is stopped in such a manner that a portion of the recorded image P is located at the upstream side in the sub-scanning direction with respect to the main scanning position A.

Thereafter, when the signal R indicating that the image signal S corresponding to an image to be subsequently recorded is inputted, is inputted from the modulator driving circuit 124 to the control circuit 122, the control circuit 122 drives to rotate the nip roller pairs 55 and 56 in a normal direction (that is, a direction in which the photosensitive material 22 is conveyed for sub-scanning).

The time T5 in FIG. 8 is the time conveying of the photosensitive material 22 by the nip roller pairs 55 and 56 is restarted. Thereafter, the conveying speed V gradually increases and comes to a predetermined value V0 in a short time, and subsequently, the photosensitive material 22 is conveyed constantly at the speed V0. After the conveying speed of the photosensitive material 22 becomes a constant speed, modulation of the laser beam B by the light modulator 108 is started at time T6. The laser light source 104 is continuously driven without being stopped to this point of time. Further, the polygon mirror 106 is also continuously driven up to this point of time. Therefore, main scanning and sub-scanning of the laser beam B is performed on the photosensitive material 22 in the same manner as described above, and a subsequent image is recorded by exposure on the photosensitive material 22.

As described above, recording of an image on the photosensitive material 22 is started some time (a time interval between T5 and T6) after conveying of the photosensitive material 22 is restarted. In this case, the image is recorded in a region indicated by the two-dot chain line in FIG. 7C. So long as driving of the nip roller pairs 55 and 56 is controlled by the control circuit 122 as described above, two adjacent images can be recorded close to each other with a short space therebetween (a distance indicated by L in FIG. 7C, for example, 3 mm or thereabouts) as in the same manner as in the case in which a plurality of images are continuously formed.

In the light beam cut-off device 100, the stepping motor 134 is driven by a driving pulse inputted from the control circuit 122, and the position of the shutter member 147 is controlled as shown in FIG. 8B. That is, the shutter member 147 is held at the open position (a position at which the laser beam B is not cut off) during recording of an image on the photosensitive material 22. In a case in which the nip roller pairs 55 and 56 are driven to rotate reverse by the control circuit 122 at the time T1 after recording of one image is completed, the control circuit 122 concurrently operates the stopping motor 134 to cause the shutter member 147 to swing from the open position to the cut-off position (a position at which the laser beam B is cut off). The hatched region D1 in FIG. 8B shows a period of time the shutter member 147 swings from the open position to the cut-off position, and after this short period of time, the shutter member 147 is stopped at the cut-off position.

When a predetermined short time has elapsed after the time T5 when conveying of the photosensitive material 22 in the sub-scanning direction is restarted, the control circuit 122 operates the stepping motor 134 to return the shutter member 147 to the open position. The hatched region D2 in FIG. 8B shows a period of time until the shutter member 147 returns from the cut-off position to the open position. At the time T6 when recording of an image is restarted, the shutter member 147 is in a state of being stopped at the open position. Accordingly, recording of an image starting from the time T6 can be normally carried out without the laser beam B being cut off by the shutter member 147.

In a state in which an image signal S is not immediately supplied after recording of one image is completed, the light modulator 108 is naturally brought into a state of cutting off the laser beam B. Nevertheless, the extinction ratio of the light modulator 108 such as AOM is above 1:1000 as described above, and therefore, it is not possible to completely cut off the laser beam B emitted from the laser light source 104 continuously driven. However, the shutter member 147 is located at the cut-off position to cut off the laser beam B until recording of a subsequent image is restarted after recording of a preceding image is completed. Therefore, a very weak laser beam B escaping (leaking) from the light modulator 108 is cut off by the shutter member 147. As a result, the very weak laser beam B does not reach the photosensitive material 22 and no fogging occurs in the photosensitive material 22.

Further, the cooling fan 136 mounted on the supporting frame 128 of the light beam cut-off device 100 blows air flow against the stepping motor 134 so as to prevent the stepping motor 134 from being heated, and further circulates the air flow in a space including the optical path of the laser beam B between the light beam scanning device 96 and the photosensitive material 22 so that the atmospheric temperature in this space is made uniform. As a result, the air density in the space through which the laser beam B passes becomes uniform, thereby making it possible to prevent occurrence of a fluctuation phenomenon caused when the laser beam B passes through a space having an ununiform air density and effectively prevent deterioration in the image quality of a photographic print, which results from the fluctuation phenomenon.

In accordance with the light beam cut-off device 100 relating to the present embodiment described above, first, the shutter member 147 is moved to the open position by the stepping motor 134 at the time the photosensitive material 22 is exposed. At the time exposure for the photosensitive material 22 is stopped, the shutter member 147 is moved to the cut-off position at which the laser beam B emitted from the light beam scanning device 96 is cut off. As a result, when an image is formed on the photosensitive material 22, the laser beam B emitted form the light beam scanning device 96 is made incident on the photosensitive material 22 without being cut off by the shutter member 147 and the photosensitive material 22 is exposed to the laser beam B to allow a latent image to be recorded thereon. Further, when exposure for the photosensitive material 22 is stopped, even if a very weak laser beam B is emitted from the light beam scanning device 96, the laser beam B is reliably cut off by the shutter member 147 located at the cut-off position, thereby making it possible to prevent occurrence of fogging in the photosensitive material 22.

In the photographic printer 10, the light beam scanning device 96 is mounted on the main body frame portion 118 via the vibration-proof rubbers 120 and transmission of a vibration from the light beam cut-off device 100 directly mounted on the main body frame portion 118 to the light beam scanning device 96 is prevented by the vibration-proof rubbers 120. As a result, it is possible to prevent deterioration of the image quality caused by fluctuation of the laser beam B on the photosensitive material 22 due to a vibration from the light beam cutoff device 100. Further, in the light beam cut-off device 100, the shutter member 147 is formed into an elongated plate extending in the main scanning direction and supported swingably between the cut-off position and the open position around the supporting shaft 142 connected at one widthwise-direction end thereof. For this reason, compared to a case in which the shutter member is moved linearly in the main scanning direction or in the sub-scanning direction so as to be movable between the position at which the laser beam B is cut off, and the open position, a space required for installation of the shutter member 147 can be made smaller and the structure of the light beam cut-off device 100 can be simplified.

Moreover, according to the light beam cut-off device 100 relating to the present embodiment, the light beam scanning device 96 does not require a shutter mechanism for the laser beam B, and the light beam scanning device 96 equipped with no shutter mechanism can be applied to the photographic printer 10 in which an image is formed on an elongated photosensitive material. Therefore, a light beam scanning device used by a photographic printer in which an image is formed on a photosensitive material (sheet paper) previously in the shape of a sheet can be applied to the photographic printer 10 in which an image is formed on roll paper without being almost altered. Accordingly, reduction in the cost of the photographic printer 10 can be facilitated.

In the light beam scanning device 96, the laser beam B outputted from the laser light source 104 is modulated by the light modulator 108, which is an external modulator, in accordance with image information. However, even when the intensity of the laser beam B outputted from a laser diode (LD), which is used as the laser light source, is directly modulated, the light beam cut-off device 100 relating to the present embodiment can naturally be applied.

The aforementioned light beam cut-off device of the present invention can be installed separately from the light beam scanning device, and makes it possible to cut off a light beam emitted from the light beam scanning device at a position immediately before photosensitive material reaches at the time exposure for the photosensitive material is stopped, and also prevent transmission of a vibration to the light beam scanning device.

What is claimed is:

1. A light beam cut-off device comprising:
    a shutter member disposed between a light beam scanning device which emits a light beam, and a photosensitive material exposed by a light beam emitted from the light beam scanning device, and supported in a movable manner between a cut-off position at which an optical path of the light beam emitted from the light beam scanning device is cut off by the shutter member, and an open position at which the shutter member retreats from the optical path of the light beam emitted from the light beam scanning device;
    a shutter driving portion for moving the shutter member to the open position at the time the photosensitive material is exposed by the light beam scanning device, and moving the shutter member to the cut-off position at the time exposure for the photosensitive material is stopped;
    a chassis member on which the shutter member and the shutter driving portion are mounted; and
    a vibration cut-off portion which prevents transmission of a vibration from the chassis member to the light beam scanning device.

2. The device of claim 1, wherein the light beam scanning device and the chassis member are supported by a supporting structure, the vibration cut-off portion is disposed at least one of between the chassis member and the supporting structure and between the light beam scanning device and the supporting structure.

3. The device of claim 1, wherein the shutter member is formed into an elongated plate extending in a main scanning direction in which the light beam is deflected by the light beam scanning device, and is supported swingably around a supporting shaft provided at one end thereof in a widthwise direction between the cut-off position and the open position.

4. The device of claim 1, wherein the chassis member has a cooling fan mounted thereon, the cooling fan cooling the shutter driving portion by air flow generated thereby and restraining a change of temperature in a space including the optical path of the light beam emitted from the light beam scanning device.

5. The device of claim 1, further comprising:
    a position sensor for detecting the shutter member located at one of the cut-off position and the open position;
    a setting section for setting a moving amount of the shutter member, by which the shutter member detected by the position sensor and located at the one of the cut-off position and the open position reaches the other of the cut-off position and the open position; and
    a shutter control section for controlling the shutter driving portion so that the shutter member moves by the moving amount of the shutter member, which is set by the setting section, when the shutter member moves from the one of the cut-off position and the open position to the other.

6. The device of claim 1, wherein the light beam scanning device and the chassis member are respectively supported by supporting structures, the vibration cut-off portion is disposed between the supporting structures.

7. A light beam cut-off device comprising:
    a shutter member disposed outside of a light beam scanning device which emits a light beam and between the light beam scanning device and a photosensitive material exposed by a light beam emitted from the light beam scanning device, and supported in a movable manner between a cut-off position at which an optical path of the light beam emitted from the light beam scanning device is cut off by the shutter member, and an open position at which the shutter member retreats from the optical path of the light beam emitted from the light beam scanning device;
    a shutter driving portion for moving the shutter member to the open position at the time the photosensitive material is exposed by the light beam scanning device, and moving the shutter member to the cut-off position at the time exposure for the photosensitive material is stopped; and a chassis member on which the shutter member and the shutter driving portion are mounted, wherein the shutter member is formed into an elongated plate extending in a main scanning direction in which the light beam is deflected by the light beam scanning device, and is supported swingably around a supporting shaft provided at one end thereof in a widthwise direction between the cut-off position and the open position.

8. The device of claim 7 further comprising a vibration cut-off portion which prevents transmission of a vibration from the chassis member to the light beam scanning device.

* * * * *

UNITED STATES PATENT AND TRADEMARK OFFICE
CERTIFICATE OF CORRECTION

PATENT NO. : 6,674,515 B2
DATED : January 6, 2004
INVENTOR(S) : Naoto Yamada

It is certified that error appears in the above-identified patent and that said Letters Patent is hereby corrected as shown below:

Title page,
Item [56], References Cited, FOREIGN PATENT DOCUMENTS, should read:
-- JP    9-121269      5/1997 --

Signed and Sealed this

Sixth Day of July, 2004

JON W. DUDAS
*Acting Director of the United States Patent and Trademark Office*